(12) United States Patent
Jain et al.

(10) Patent No.: US 9,680,923 B1
(45) Date of Patent: Jun. 13, 2017

(54) PLATFORM AND NETWORK FOR JOINT DISTRIBUTION OF CONTENT BY MULTIPLE PUBLISHERS

(71) Applicants: Pranav Jain, Maharashtra (IN); Pravin Jain, Maharashtra (IN)

(72) Inventors: Pranav Jain, Maharashtra (IN); Pravin Jain, Maharashtra (IN)

(*) Notice: Subject to any disclaimer, the term of this patent is extended or adjusted under 35 U.S.C. 154(b) by 0 days.

(21) Appl. No.: 15/287,338

(22) Filed: Oct. 6, 2016

(51) Int. Cl.
*G06F 15/16* (2006.01)
*H04L 29/08* (2006.01)

(52) U.S. Cl.
CPC .............. *H04L 67/10* (2013.01); *H04L 67/02* (2013.01); *H04L 67/06* (2013.01); *H04L 67/20* (2013.01)

(58) Field of Classification Search
None
See application file for complete search history.

(56) References Cited

U.S. PATENT DOCUMENTS

| | | | |
|---|---|---|---|
| 7,260,823 B2 | 8/2007 | Schlack et al. | |
| 7,308,420 B1 | 12/2007 | Storch et al. | |
| 2002/0124246 A1 | 9/2002 | Kaminsky et al. | |
| 2005/0119939 A1 | 6/2005 | Henning et al. | |
| 2006/0020523 A1 | 1/2006 | Song | |
| 2007/0130008 A1* | 6/2007 | Brown | G06Q 30/02 705/14.39 |
| 2009/0049468 A1 | 2/2009 | Shkedi | |
| 2009/0172728 A1 | 7/2009 | Shkedi et al. | |
| 2010/0217665 A1* | 8/2010 | Sharma | G06Q 30/02 705/14.45 |
| 2010/0250338 A1 | 9/2010 | Banerjee et al. | |
| 2010/0332304 A1 | 12/2010 | Higgins et al. | |
| 2015/0287100 A1* | 10/2015 | Jain | G06Q 10/10 705/14.69 |
| 2016/0063575 A1* | 3/2016 | Marino | G06Q 30/0276 726/27 |

(Continued)

OTHER PUBLICATIONS

'en.wikipedia.org' [online]. "Co-branding," Jun. 2012, [retrieved on Apr. 13, 2017]. Retrieved from the Internet: URL https://en.wikipedia.org/wiki/Co-branding,>. 4 pages.

(Continued)

*Primary Examiner* — Joshua Joo
(74) *Attorney, Agent, or Firm* — Fish & Richardson P.C.

(57) ABSTRACT

Methods, systems, and apparatus, including computer programs encoded on a computer storage medium, for joint distribution of content by multiple publishers. In one aspect, a method performed by one or more computers includes receiving data from a first content publisher, as well as accessing a publisher database that indicates information about other content publishers. A first set of candidate publishers is selected based on compatibility with characteristics specified by the first content publisher. A second set of candidate publishing partners is selected, as a subset of the first set of candidate publishing partners, based on compatibility of the first content publisher with characteristics specified by the candidate publishing partners. One of the content publishers in the second set of candidate publishing partners is selected, and a jointly published content item that references both the first content publisher and the selected publishing partner is provided for presentation to content recipients.

20 Claims, 8 Drawing Sheets

(56) References Cited

U.S. PATENT DOCUMENTS

2016/0155148 A1* 6/2016 Ismail ................ G06Q 30/0251
705/14.53

OTHER PUBLICATIONS

'en.wikipedia.org' [online]. "Comparative advertising," May 2011, [retrieved on Apr. 13, 2017]. Retrieved from the Internet: URL https://en.wikipedia.org/wiki/Comparative_advertising>. 8 pages.
'www.facebook.com' [online]. "Clicks to Website: Carousel," May 19, 2016, [retrieved on Apr. 13, 2017]. Retrieved from the Internet URL https://www.facebook.com/business/ads-guide/clicks-to-website/carousel?toggle0=Photo>. 3 pages.

* cited by examiner

PLATFORM AND NETWORK FOR JOINT DISTRIBUTION OF CONTENT BY MULTIPLE PUBLISHERS

TECHNICAL FIELD

The present specification relates to techniques for efficiently distributing content on media platforms, such as the networked platforms such as the Internet, as well as television, radio, magazines, newspapers, and other media channels.

BACKGROUND

A wide variety of individuals and organizations generate content and publish it through various media channels. Many publishers create content independently to maximize creative control, and then provide the content for distribution through a media channel. For example, videos produced by different organizations are generally displayed sequentially, with each video having exclusive presentation during its associated playback time. As another example, content in web pages is generally set apart by publisher, with each publisher having content displayed on a specific region of a web page. While third-party content may be included in a web page, it is generally set apart in an inline frame, showing content independently generated by the third party. It is also served separately, often through separate network requests and servers, requiring additional delays and bandwidth when loading on user devices. These issues are magnified for each additional publisher that shows content on a platform.

Standard techniques for publishing content usually involve media content items generated separately and distributed separately, with individual publishers retaining independent control over the content item. While this approach provides independence and flexibility, it also introduces inefficiencies and can lower the quality of a user experience. Further, many publishing platforms have requirements for discrete content lengths and sizes that may not be appropriate for may content publishers. For many publishers, even a minimum duration or size of media presentations permitted by a publishing platform may be excessive for some publishers.

SUMMARY

In some implementations, a system and network can obtain information about different publishers and select publishers to publish content jointly. To select publishers to jointly distribute content, the system can use information about the characteristics of each publisher. The system can also use information specified by each publisher, such as preferences or requirements that indicate preferred characteristics for a partner and/or the types of publishing opportunities the publisher is interested in. The system can then cause a joint content item to be published through one or more media channels, such as the Internet (e.g., web pages, social media, blogs, videos, etc.), television, radio, magazines, newspapers, and others. The system can use any of a number of techniques to select publishers to publish jointly, including the generation of compatibility scores, machine learning techniques, and other techniques.

In some implementations, the system can also track the viewership of jointly distributed content. The system may also track actions that viewers perform during or after viewing the joint content. With this information the system can provide recommendations and analysis results to the publishers to show how the objectives of the publishers are being met.

In some implementations, the system can use information about joint content publications by different sets of publishers to update a publisher database and/or a publisher selection model. Based on the observed effects of publishing joint content to certain audiences or with certain combinations of publishers, the system can refine the data sets and/or models used to select publishers that are assigned to jointly publish together.

In some implementations, the techniques discussed herein enable publishers to gain additional flexibility when providing content through third-party publishing platforms. For example, a publishing platform (e.g., a web page, a streaming media service, a television channel, etc.) may set specific ranges of size and/or duration of media that may be published in certain channels. In many cases, publishing platforms may set discrete sizes or durations for media items. The discrete or standard options permitted by a publishing platform are not appropriate for many publishers. For example, many publishers would prefer a smaller size or shorter duration, with a corresponding reduced cost, but the publishing platform may not support smaller sizes or non-standard sizes.

The system discussed herein can allow a publisher to overcome publishing platform restrictions to provide more fine-grained media presentations. In particular, the system can increase the flexibility of publishers to provide content and also allow publishers to provide non-standard content elements within the standard framework required by a media channel. For example, the system can identify multiple publishers that have compatible requirements, and cause a joint content item having elements from each of the multiple publishers to be presented in a third-party media presentation area. The joint content may be configured to simultaneously show content from multiple publishers, either in distinct sections of the media presentation area or with the content elements of multiple publishers integrated or interspersed in the media presentation area. This can provide the further advantage of creating brand relationships that would not be formed through independent presentations of individual content.

A number of other advantages may be obtained, as further discussed below. For example, partnering with compatible publishers identified by the system can expand a publisher's audience in targeted areas. The system can also identify compatible publishers while maintaining the confidentiality of the requirements and objectives of each publisher. Further, the system can lower the risks of publishing content, as costs can be shared among multiple publishers.

In one general aspect, a method for joint distribution of content by multiple publishers comprises: receiving, by the one or more computers, publisher request data for a first content publisher, the publisher request data indicating preferred characteristics for a publishing partner to distribute content jointly with the first content publisher; accessing, by the one or more computers, a publisher database that indicates characteristics of other content publishers and publisher request data of the other content publishers; selecting, by the one or more computers, a first set of candidate publishing partners for the first content publisher based on a degree of compatibility between (i) the preferred characteristics specified by the first content publisher and (ii) the characteristics of the other content publishers indicated in the database; selecting, by the one or more computers, a second set of candidate publishing partners as a subset of the first set of candidate publishing partners based on a degree of compatibility between (i) characteristics of the first content publisher and (ii) the publisher request data of the candidate publishing partners; designating, by the one or more computers, one of the content publishers in the second set of candidate publishing partners as the publishing partner for the first content publisher; and based on designating one of the content publishers in the subset as the publishing partner for the first content publisher, causing, by the one or more computers, a jointly published content item that references both the first content publisher and the selected publishing partner to be provided for presentation to content recipients.

Implementations may include one or more of the following features. For example, in some implementations, selecting the first set of candidate publishing partners includes determining a plurality of compatibility scores. Each of the compatibility scores indicates a degree of match between preferred characteristics specified by the first content publisher and the characteristics of a specific content publisher of the multiple content publishers described in the publisher database. Selecting the first set of candidate publishing partners also includes: ranking the multiple content publishers based on the compatibility scores; and selecting, as the first set of candidate publishing partners, a highest-ranking subset of the multiple content publishers.

In some implementations, selecting the second set of candidate publishing partners includes determining a compatibility score for each of the candidate publishing partners in the first set. The compatibility score for each specific candidate content publisher indicates a degree of match between the characteristics of the first content publisher and the preferred characteristics that the specific candidate content publisher specified for a publishing partner. Selecting the second set of candidate publishing partners can also include: ranking the candidate publishing partners in the first set based on the compatibility scores; and selecting, as the second set of candidate publishing partners, a highest-ranking subset of the candidate publishing partners in the first set of candidate publishing partners.

In some implementations, receiving the publisher request data for the first content publisher comprises receiving data indicating a distribution objective of the first content publisher. Accessing the database can include accessing a database that indicates distribution objectives of the multiple content publishers. Determining the compatibility score for a candidate publishing partner can be further based on a degree of match between the distribution objective of the first content publisher and a distribution objective of the candidate publishing partner.

In some implementations, determining the first set of candidate publishing partners or the second set of candidate publishing partners includes: determining a brand signature for the first content publisher; and comparing the brand signature for the first content publisher with brand signatures in the database.

In some implementations, causing the jointly published content item to be provided for presentation to content recipients includes: causing the jointly published content item to be provided for presentation through one or more media channels. The one or more media channels can include at least one of television, radio, a newspaper, a magazine, printed mail, an application, a web page, e-mail, or social media.

In some implementations, the method includes, after causing the jointly published content item to be provided for presentation, obtaining data indicating viewership and/or actions performed by viewers of the jointly published content item.

In some implementations, the method includes evaluating the partnership of the first content publisher with the selected publishing partner based on the data indicating viewership and/or actions performed by viewers of the jointly published content item.

In some implementations, the method includes updating the publisher database based on the evaluation, wherein updating the publisher database alters one or more parameters used to generate compatibility scores for content publishers and candidate publishing partners.

In some implementations, the method includes determining a first amount of the actions performed that are attributable to the first publisher and a second amount of the actions performed that are attributable to the second publisher.

In some implementations, the method includes determining an allocation of costs for publishing the jointly published content item based on the first amount and the second amount.

In some implementations, the method includes determining a measure of brand affinity for the first content publisher and the selected publishing partner based on the data indicating viewership and/or actions performed by viewers of the jointly published content item.

In some implementations, the jointly published content item has multiple corresponding actions including a first action for the first content publisher and a second action for the selected publishing partner. Determining a measure of brand affinity includes determining a measure of viewers of the jointly published content item that performed both the first action and the second action after viewing the jointly published content item.

In some implementations, obtaining data indicating viewership and/or actions performed by viewers of the jointly published content item comprises obtaining eye movement data indicating eye movements of viewers while viewing the jointly published content item. The method can include determining, based on the eye movement data, one or more scores indicating levels of engagement of the viewers with a first portion of the jointly published content item that corresponds to the first content publisher and a second portion of the jointly published content item that corresponds to the selected publishing partner.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
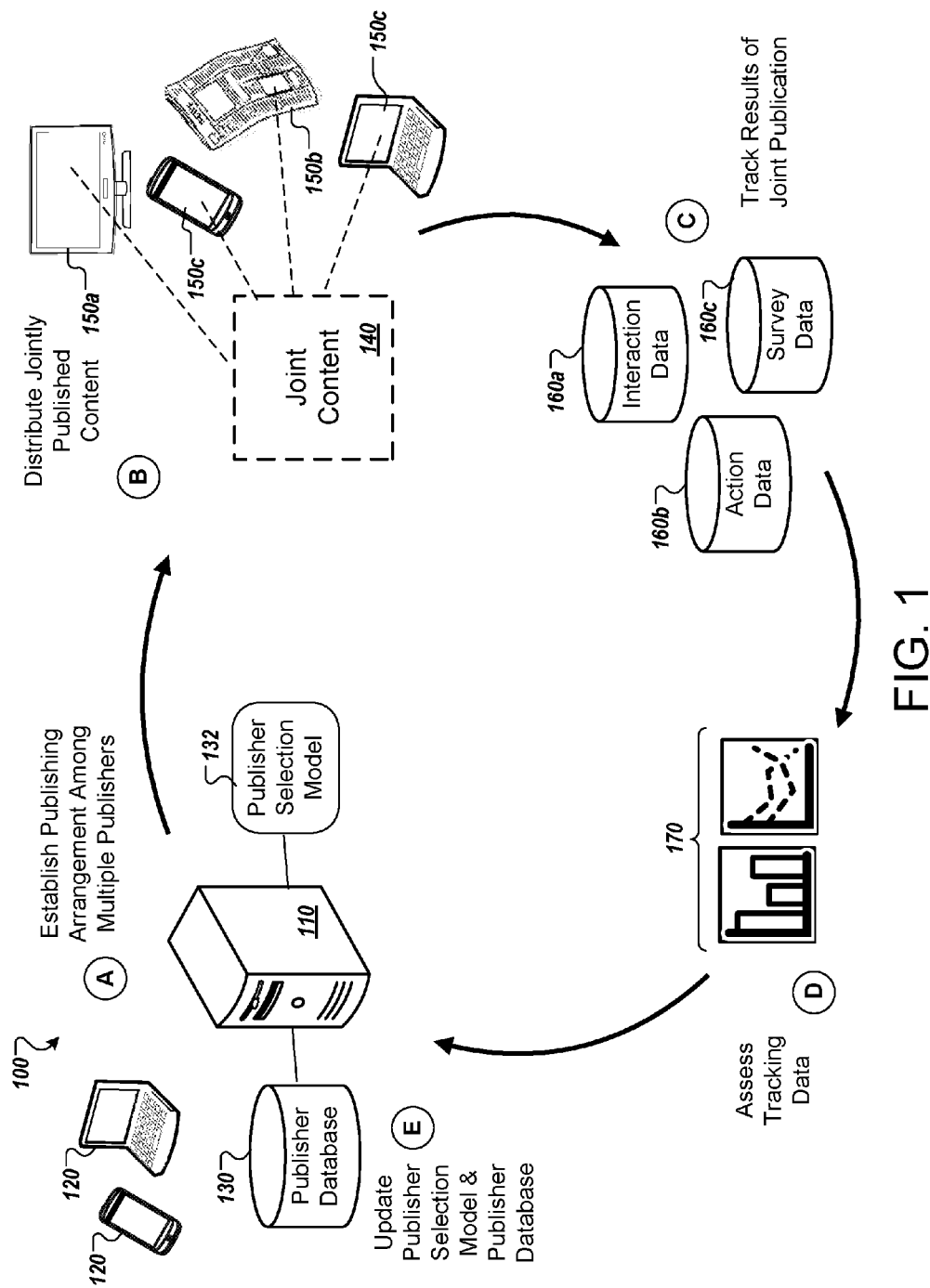
FIG. 1 is a diagram of an example system for joint distribution of content.

A vast amount of content is published daily by many different publishers. In general, a publisher refers to an entity that provides content to be distributed through a media channel, and the publisher does not necessarily control or operate the media channel. For example, a publisher might provide a video to be shown on a streaming video service, such as YouTube. As another example, a publisher may submit content to be displayed on a display region of a web page, without hosting or owning the web page on which the content is displayed. The publisher can be an individual, an organization such as a company, or another type of entity. Publishers create content and distribute it through many different media channels, such as the Internet (e.g., web pages, social media, blogs, videos, etc.), television, radio, magazines, newspapers, and others.

In many conventional systems, each publisher generates content independently, and each publisher may be required to pay the costs of distribution through a media platform. The large numbers of different publishers distributing content separately leads to inefficiency and redundancy. Many publishers face limits to the audiences they can effectively reach, and find costs of expanding distribution prohibitive. Similarly, the sheer volume of content being published can be a challenge to the effectiveness of publishing content, since users of media channels are often inundated with media from multiple sources.

This document describes systems and processes that enable publishers to jointly create and distribute content, leading to more efficient and effective distribution. For example, two publishers with significantly different audiences can jointly distribute a content item, such as an image or video, that simultaneously includes content of both publishers. Among other items, the jointly distributed content item can include brand information for both publishers to identify the publishers to the viewer. The cost to each publisher for jointly distributing the content item can be much less than a single publisher distributing a content item. Similarly, the joint content item can benefit individuals. For example, providing joint content can conserve network bandwidth by requiring only one transfer instead of two that would be required to transfer separate content items. Similarly, the user experience is enhanced by reducing the need to switch between content items, since a single content item presentation can take the place of multiple separate presentations by conventional techniques.

The techniques discussed herein enable publishers to use joint publication to avoid many limitations set by third-party publishing platforms. For example, publishing platforms may set specific ranges of size and/or duration of media that may be published in certain channels. In many cases, platforms may set discrete sizes or durations for media items (e.g., a 468 pixel by 60 pixel image area, or a 30-second video duration). The discrete or standard options permitted by a publishing platform are not appropriate for many publishers. For example, many publishers would prefer a smaller size or shorter duration, with a corresponding reduced cost, but the publishing platform may not support smaller sizes or non-standard sizes. The system discussed herein can allow a publisher to overcome these publishing platform restrictions to provide more fine-grained media presentations. For example, it can increase the flexibility of publishers to provide content and also allow publishers to provide non-standard content elements within the standard framework required by a media channel.

As an example, the system can identify multiple publishers that have compatible requirements, and cause a joint content item having elements from each of the multiple publishers to be presented. In the case of a standard 468 pixel by 60 pixel display area, the system may allow multiple publishers to jointly provide a single content item that covers the entire area, but mixes or intersperses the content of each publisher in the display area. As another example, the system may allow two publishers to each provide compatible content to be displayed simultaneously in adjacent 234 pixel by 60 pixel areas. The system may allocate the area in any appropriate manner, e.g., four 117 pixel×60 pixel areas, six 156 pixel×30 pixel areas, areas of unequal size or irregular shape, and so on.

Audio or video may be published jointly in similar manner, for example, with the content of multiple publishers being shown together in a content distribution space (e.g., a time slot for television, radio, streaming Internet media, etc.) either simultaneously or sequentially. For example, a video may show content elements of multiple publishers mixed throughout the display area or shown in separate portions of the display area. In addition, or as an alternative, the full display area may include content elements of different publishers shown exclusively over sequential periods, for example, a 30-second video time slot being filled with six five-second video segments by different publishers. As discussed further below, publishers are selected using information about their different attributes and requirements, so that the system can assign compatible publishers to jointly distribute content in publishing opportunities that suit each of their needs.

Joint publication can provide other advantages. For example, the joint distribution of content can help each publisher expand its influence with the audience of the other publishing partners. Within each joint content item, the content elements of each publisher may appeal to certain individuals, and so will reach and retain the interest of that publisher's typical audience. The combined appeal of the joint content item can thus extend to a larger audience than that of any individual publisher, and so expand the exposure to larger or more diverse audiences. Along with the expanded influence, distribution costs are shared among the multiple publishers and thus are lower for each publisher than for independent distribution.

As another advantage, joint distribution can promote the formation of associations between publishers, such as company brand associations perceived by individuals. With prior techniques, establishing these associations is often difficult, and publishers generally have difficulty identifying potential publishing partners that would be a good fit. The systems described in this document provide publishers the ability to identify which other publishers are most appropriate to partner with to achieve specific objectives. The systems help publishers to create these associations, especially by identifying, for individual publishers, the other publishers that satisfy the necessary criteria to efficiently reach specific audiences. The systems also measure and evaluate the strength of associations formed and the overall effectiveness of a partnership. The response of audiences to joint publication can be used to dynamically adjust the allocation of distribution expenses among publishers. Similarly, audience responses can be used to update the publisher selection system, so that partnerships are even more effective in the future.

FIG. 1 is a diagram of an example system 100 for joint distribution of content. The system 100 assists individual publishers through many aspects of jointly distributing content with other publishers. FIG. 1 shows an overview of several major aspects of joint publishing, including selecting publishing partners, carrying out distribution of content, tracking results, assessing the tracked data, and updating aspects of the system 100 to improve effectiveness. These different aspects are represented as stages (A) to (E). The overall process represented by these stages can be performed for each of many independent publishers. Similarly, the process may be repeated many times for individual publishers, as well as performed in parallel as many different publishers partner with others to distribute content. Each of the different stages represented in FIG. 1 are described in further detail with respect to FIGS. 2-8.

The system 100 includes a computing system 110, which can represent one or more computers. This computing system 110 may represent a server system, which may be comprised of computers at a single location or spread across multiple locations. The computing system 110 communicates with different publisher systems 120. These publisher systems represent devices or other systems operated by various publishers that take advantage of the capabilities of the system 100. These individual publisher systems 120 represent independent publishing entities, and may each communicate with the computing system 110 over a network. The computing system 110 collects data from the various publisher systems 120 and stores it in a publisher database 130, which can represent any appropriate type of local and/or remote data storage system.

In stage (A), the computing system 110 assists publishers to identify publishing partners and establish joint publishing arrangements. The computing system 110 obtains information describing each publisher. Some information can be self-reported, e.g., provided by the publisher systems 120, while other information about publishers can be obtained from third-party data sources, such as other server systems or from survey data. The information indicating characteristics of each publisher, including objective data describing a publisher's current audience or user base, position in an industry, perception by individuals, and so on. The characteristics of each publisher are stored in the publisher database 130.

The computing system 110 also receives, from each of the publisher systems 120, publisher request data indicating the characteristics that the publisher desires for a publishing partner. Each publisher may be looking for something different in a publishing partner. As an example, some publishers may desire to partner with another publisher in the same industry, while other publishers may desire to partner with a publisher in a different industry. Each publisher may have specific objectives about the type of publishing partner to work with as well as a type of audience to be reached, the type of content to be distributed, the timing and extent of a publishing campaign, and so on. The computing system 110 receives and stores this preference information for each publisher.

With the information in the publishing database 130, the computing system 110 selects one or more publishers as publishing partners. For example, for each particular publisher, the computing system 110 uses the characteristics and requirements in the publishing database 130 to match the particular publisher with one or more other publishing partners. A publisher and the one or more publishers selected to publish together are referred to as a publishing group. As discussed further with respect to FIG. 2, the selection process can involve two-way matching, so that each publisher in a publishing group has its own unique requirements satisfied. Beyond simply meeting the requests of the publishers, the computing system 110 also uses information obtained from previously formed publishing partnerships to facilitate the types of joint publishing arrangements that have been determined to be most successful for other publishers. The selection process can use a publisher selection model 132 that generates scores or other measures of the suitability of different publishers for joint publishing, given each publisher's characteristics and objectives. The publisher selection model 132 can leverage machine learning techniques, for example, by including a trained neural network, classifier, support vector machine, decision tree, or other machine learning system to assess the appropriateness of different publishers to publish jointly, taking into account the different objectives specified by the publishers.

Once a publishing partner is selected for a publisher, the two publishers are notified, at publisher systems 120, of the selections and the recommended publishing group. The publishers collaborate to generate a joint content item, e.g., a media item such as video, audio, an image, text, etc. This joint content item can simultaneously reference each of the publishers in the publishing group. When the publishers are companies, for example, the products and services of each publisher can be simultaneously shown and/or described together, even if the products and services are unrelated. Links, buttons, and other interactive elements for both publishers can be included in the joint content item also. As a result, a single presentation of the joint content item can provide the messages of all publishers in the publishing group, as well as promote an association between the publishers and their different products and services, if any, to a recipient of the content.

In stage (B), the publishing system 100 causes the joint content 140 for a publishing group to be provided as output to media consumers. Media content from different publishers can be developed jointly, or be developed separately and be packaged into a single joint content item. The joint content 140 can then be distributed on third-party publishing platforms. The joint content 140 may be provided over multiple media channels, such as television 150a, newspapers 150b and other print media, the Internet 150c (e.g., in web pages, applications, social media, blogs, vlogs, streaming videos, banners or embedded frames, etc.), radio, direct messaging (e.g., short message service (SMS) text messages, e-mail messages, etc.), and so on. The joint content 140 may include versions for any or all of these different media channels.

The joint content 140 can have any of various properties. In some instances, content elements of multiple publishers are included in a single item of joint content (e.g., an image, an animation, a video segment, an audio segment, a text segment, a set of HTML code or other script). The item of joint content 140 can be designed to fit in a presentation space of a third-party publishing platform. The presentation space may be a time slot or display area, for example. Within the item of joint content 140, the content elements from different publishers may be combined in different ways. For example, content elements from different publishers can be arranged to be displayed simultaneously. For example, two publishers promoting two different products can generate joint content 140 that shows the two products at the same time, at least for a portion of the time, or the majority of the time, the duration that the joint content 140 is presented. The content elements of multiple publishers can be integrated or combined, for example, with elements from different publishers interspersed within the display area for the joint content 140. As another example, the joint content 140 can split a display area, so that each publisher has its content shown in a different section of the joint content.

The joint content can subdivide a media presentation space in time, in area, or in any appropriate manner. For example, the joint content 140 could be a text-based message to be presented on a search results page, and a first line of text could include content of one publisher, and a second line could include content of another publisher. The joint content 140 could be submitted for presentation by the search engine as a single item, however, so that the two lines of text from different publishers are presented together each time, as a single content unit. As another example, the joint content 140 could be a video presented on a television channel or other video platform. Different publishers can place content items in separate areas of the video (e.g., respectively shown simultaneously on right and left sides of the video frames), or could each have content dispersed throughout the video display area. As another example, the joint content 140 could subdivide the allotted video presentation in time, with each publisher having a portion of the overall time window. For example, the computing system 110 can divide a 30-second window for a video clip into three 10-second segments, or five 6-second segments, or in another combination of segments. Each publisher may be assigned one or more segments in which their content will be provided. A video segment may exclusively include the content of a single publisher, or may show content for multiple publishers. For example, different segments within the video presentation time window may show content of different combinations of publishers. For certain publishing opportunities, such as for an advertisement during a sports championship game or other high-demand opportunities, individual publishers may not have the resources to secure publication. The computing system 110 can enable a group of multiple publishers to collectively take advantage of an opportunity by distributing an item of joint content 140. Similarly, third-party publishing platforms generally have restrictions and limitations, e.g., a maximum or minimum size, a maximum or minimum duration, and so on. With the joint content 140, multiple publishers have additional flexibility to tailor the properties of the media to be presented with options not available from the third-party publishing platform.

In stage (C), distribution of the joint content 140 and responses of users are tracked to assess the results of the joint content distribution. The computing system 110, as well as other servers or tracking systems, may cooperate to acquire and store this data. A variety of information can be collected and provided to the computing system 110. For example, the time and duration of individual presentations of the joint content 140 can be recorded. Similarly, interactions of users with the joint content 140 can be detected and recorded. As another example, surveys can be provided to users to determine a viewer's opinions and perceptions soon after viewing the joint content 140, and/or after at least a certain amount of time has passed after viewing the joint content 140. In addition, user behavior data can be obtained for users that viewed the joint content 140. The user behavior data can indicate, for example, whether the users have visited a particular geographic location or type of location associated with the joint content 140 or its publishers, visited a web page or other virtual location associated with the joint content 140 or its publishers, purchased an item related to the joint content 140 or its publishers, submitted a query related to the joint content 140 or its publishers, and so on.

In FIG. 1, just a few of the many types of tracking data that can be obtained are shown. For example, interaction data 160*a* representing user interactions with the joint content 140 can be obtained. Action data 160*b* can include histories or logs indicating actions that users have taken can also be obtained. The tracked actions may be occur separately from the presentation of the joint content 140, e.g., later visits to web pages, purchases or other transactions for items shown in the joint content 140, submission of queries regarding elements of the joint content 140, and so on. Viewer survey data 160*c* can include user responses to surveys that are given to users who have been presented the joint content 140. As these examples show, a variety of information can be obtained about objective and subjective effects of the joint content publication, as well as short-term and long-term impact of the joint content publication, including users' perception of, and actions with respect to, each of the publishers who jointly publish the joint content 140.

Viewership information is another type of information that the computing system 110 can obtain. For example, the number and type of viewers of joint content can be tracked for each item of joint content 140 that is provided. The information may be obtained from individual devices, such as phones, tablets, computers, set top boxes, and so on, as the content is viewed. In addition, or alternatively, the viewership information may be obtained through survey data or be provided by an operator of the media channel, e.g., a newspaper, magazine, internet service provider or Internet hosting company, and so on. Depending on the media channel, viewership information may indicate how many people viewed the joint content 140 and/or when or in what manner they viewed the joint content 140. The information may indicate viewership of users with certain attributes (such as age, location, etc.) or combinations of attributes.

In stage (D), the computing system 110 assesses the tracking data to evaluate the effectiveness of the joint publication arrangement. The computing system 110 generates analysis results 170 that can be provided to the publishers of the joint content 140, where the analysis results 170 can include scores, reports, charts, graphs, recommendations, and other information. The analysis results 170 can indicate to each publisher whether its objectives are being achieved through the publication of the joint content 140. For example, the computing system 110 can compare the objectives and requirements that a publisher specified during stage (A) with the results determined from the traced data 160*a*-160*c*. As a result, each individual publisher can receive information indicating whether the joint publication was effective in achieving results of interest to that publisher, for example, reaching a certain audience, prompting certain user actions, establishing or strengthening associations between certain publishers, and so on. The analysis of the computing system 110 can be used to set an allocation of distribution costs among the joint publishers based on the tracked results. For example, rather than sharing responsibility for the distribution costs equally among publishers, or by a pre-set amount, the computing system 110 may vary the allocation (e.g., 60% and 40%, or 75% and 20%) based on the results indicated by the tracked data. For example, a publisher's share of the cost of distributing joint content can be determined according to the interactions, survey responses, or other actions that relate to that publisher's elements in the joint content 140. That is, each publisher's share can be set in proportion to the share of user interaction or attention directed to that publisher, which significantly reduces the risk and costs if joint content does not achieve the intended results. For example, if joint content 140 includes links or other interactive elements for two different publishers, and the elements of one publisher are selected more often, that publisher may be assigned a greater share of the distribution costs.

As part of assessing the publication of the joint content 140, the computing system 110 can determine a measure of association of publishers that is perceived by viewers of the joint content 140. This assessment may include measuring changes in perception of the publishers that can be attributed to the publication of the joint content 140. The analysis may also determine other information from the tracking data, such as which media channels produce the best results for each joint content item or for each publisher, or for a particular media channel which presentation parameters were most effective. Since different publishers may have different objectives and measures of interest, the computing system 110 can obtain different types of analysis results 170 for different publishers of the same joint content 140. For example, one publisher of the joint content 140 may be interested in maximizing viewer engagement with the joint content 140 as it is presented, while another publisher of the same joint content 140 may be interested in prompting a particular user action after the joint content 140 has been viewed. As a result, the computing system 110 may provide different analysis results 170 to different publishers according to the items that individual publishers have designated as measurement criteria. In some implementations, the measurement criteria for a publisher are derived from the publisher request data that specifies a publisher's preferences or requirements. For example, if a publisher indicates that presentation to a particular age range of users is desired, the computing system 110 may provide analysis results showing analysis broken down by age of the viewer. As another example, if a publisher specifies a time of day for the content to be provided, the computing system 110 can provide a rate that certain user actions occurred vs. the time of day that viewing of the joint content occurred.

The computing system 110 can also determine and provide recommendations for adjusting the publication of the joint content 140. For example, the computing system 110 can assess the impact of different distribution parameters on various aspects of the results, to determine, for example, which measures are affected by particular media channels, times of presentation of the joint content 140, and other factors. From this information, the computing system 110 can recommend shifting the times of presentation, changing the type of media channel used for distribution, or making other changes to increase the effectiveness of future presentations of the joint content 140 in achieving certain results. In some implementations, the computing system 110 may recommend to alter the joint content itself, based on analysis of the tracking data and/or comparison with tracking data of other joint content published by other publishers. In some instances, the computing system 110 may recommend to alter the publishing group that distributes the joint content 140 by adding an additional publishing partner or removing a publishing partner. The recommendations from the computing system 110 can be provided to the publishers in the publishing group. The publishers that elect to apply recommended changes can provide this information to the computing system 110, which can implement the changes for subsequent distribution of the joint content 140.

In stage (E) the computing system 110 updates the publisher selection model 132, the publisher database, and/or other elements of the system 100. The publisher selection model is used to select which publishers to match together for joint publishing. The publisher selection model can include data, algorithms, and/or other elements for evaluating and ranking the appropriateness of different publishers to distribute content jointly. As an example, the publisher selection model 132 can include a number of weights or other parameters used to define the relative importance of different publisher characteristics. These weights or other parameters can be adjusted based on the evaluation of tracking data for joint publication by different groups of publishers. As another example, the publisher selection model 132 may include a machine learning classifier, such as a trained neural network, that processes publisher information to generate a score or classification. The tracking data 160a-160c and the analysis results 170 can be used as training data to train or refine the machine learning classifier further, leading to more accurate outputs by the classifier.

Over time, as the results of many publishing partnerships are assessed, the computing system 110 evaluates the differing results to identify which publisher characteristics are most predictive of successful joint distribution campaigns. This can include an analysis that compares and contrasts the results from different joint publication groups to determine which variables are most strongly indicative of specific outcomes. These determinations can be context-dependent, so that the relative importance of factors varies depending on combinations of publisher characteristics, e.g., publisher size, location, existing brand recognition, and so on. For example, taking a publisher's size into consideration, the computing system 110 can determine that certain factors are most important for small companies, while a different set of factors are most important for large companies. The computing system 110 may determine weights or adjustment values for each of various different factors given different contexts, e.g., with different weight values used to indicate the importance of a geographical location factor based on the context of whether the publisher is an individual, a small company, a medium-sized company, or a large company. These updated weight values can be parameters of the equations that the computing system 110 uses to generate scores for selecting publishers to match together.

The computing system 110 can also periodically update information about publishers in the publisher database 130. The additional information can be acquired directly from publisher systems 120 as well as from other sources, e.g., published data, survey results, government records, and so on. Updating this information can ensure that publishing groups are formed based on current information to generate the most appropriate publishing groups to meet different publishers' requirements.

Figure 2:
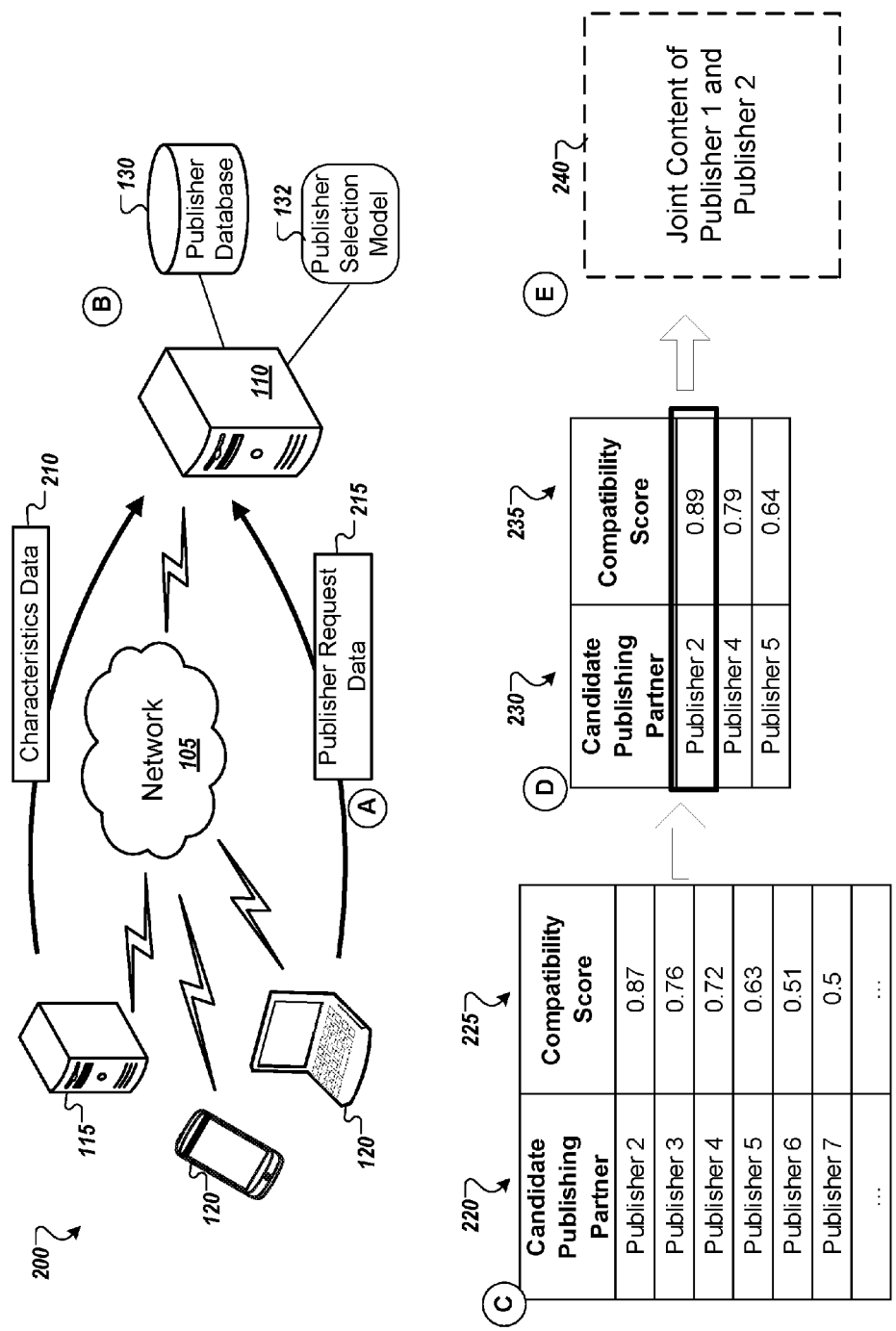
FIG. 2 is a diagram of an example system for facilitating joint distribution of content by multiple publishers.

FIG. 2 is a diagram of an example system 200 for facilitating joint distribution of content by multiple publishers. The system 200 includes the publisher systems 120, as well as the computing system 110, the publisher database 130, and the publisher selection model 132. The system 200 includes other elements, including a computer network 105 over which the various devices communicate, and one or more servers 115 that provide information about publishers.

The example of FIG. 2 shows various actions that can be performed to establish a publishing partnership between one publisher, e.g., "Publisher 1," and one or more other publishers selected using the publisher database 130 and the publisher selection model 132. The example shows processing that occurs over multiple different stages, labeled (A) through (E), which represent a flow of data during the publisher selection process.

In stage (A), the computing system 110 receives information from various publisher systems 120. For example, many different publishers, e.g., individuals, companies, etc., can provide at least two types of data to the computing system 110. The first type of data is characteristics data 210, which indicates characteristics of the publisher. The second type of data is publisher request data 215, which indicates the type of publishing partner that is requested, e.g., requirements or preferences that another publisher would need to satisfy to qualify as a potential publishing partner.

The characteristics data 210 can include a variety of information about a publisher, such as the publisher's size, geographical location, user base, industry, level of brand recognition, and so on. The computing system 110 can provide a web page, web application, or other data over the network 105 to cause the publisher systems 120 to display a user interface for entering the characteristics data 210. Submitted data is then received by the computing system 110 over the network 105. In some implementations, the computing system 110 additionally or alternatively obtains characteristics data 210 from third-party data sources such as one or more servers 115. In this manner, the computing system 110 can supplement or verify the user input from the publisher systems 120 to more accurately record the characteristics of each publisher that participates in joint publishing.

The publisher request data 215 can specify the requirements that a publisher has for a potential partner. In the example of FIG. 1, Publisher 1 may specify that a publishing partner should have at least a minimum size and have a geographical presence in New York City. These requirements are independent of the characteristics of Publisher 1. For example, a publisher in one industry may request to jointly publish with a publisher in a specific, different industry, or may be open to publishing with others in any industry. In some implementations, publishers can specify requirements corresponding to any of the characteristics of publishers indicated in the publisher database 130. The computing system 110 can permit publishers to specify combinations of different attributes that a publishing partner should have. As with the characteristics data 210, the computing system 110 can provide a web page or other data that enables publisher systems 120 to display a user interface for entering the publisher request data 215.

In some implementations, the computing system 110 also permits publishers to specify publishing objectives as part of the publisher request data 215. For example, apart from characteristics of potential partners, a publisher may specify one or more desired outcomes of a publishing partnership, such as increasing an audience, establishing brand recognition with a specific audience segment, creating an association with a certain product or industry, reaching a particular level of visibility (e.g., front-page of a newspaper, prime-time television display, etc.), and so on.

In stage (B), the computing system 110 processes and stores the characteristics data 210 and the publisher request data 215 for each of the publishers. In some implementations, the computing system 110 standardizes the various inputs into common data formats or ranges. Information can be quantized or compressed by assigning a value to represent a range (e.g., for publisher size, a value of 0 for an individual, 1 for a company of less than 500 people, and so on). This standardization can assist in quickly comparing values across multiple publishers, and in efficiently generating scores to evaluate the appropriateness of having different publishers publish jointly.

The computing system 110 may generate a representation of a publisher's characteristics referred to as a brand signature. This signature may be a compact representation of key elements of a publisher's current influence. In some implementations, the signatures may be a vector of values, e.g., [0, 4, 2, 9, 1,], where each value represents a different characteristic or attribute of the publisher or the publisher's influence on media consumers. For example, for all publishers, the first value can indicate size, the second value can indicate a geographical location code, and so on. Other forms of expressing a brand signature can alternatively be used.

In state (C), the computing system 110 uses the information in the publisher database 130 to select a first set of candidate publishing partners 220 for Publisher 1. For example, the computing system 110 generates compatibility scores 225 that indicate a degree of compatibility between (i) the preferred characteristics specified by Publisher 1 and (ii) the characteristics of the other content publishers indicated in the publisher database 130. These scores can be determined in a variety of ways. The publisher selection model 132 can include data, equations, machine learning classifiers, and other elements to generate the compatibility scores 225. As an example, a set of values (e.g., a vector) representing the publisher's requirements for a partner can be compared with a set of values indicating the publisher characteristics (e.g., a brand signature). For each individual characteristic specified in a publisher's requirements, a compatibility measure can be calculated, e.g., with a value of "1" for an exact match to a publisher's requirement, and values decreasing as differences from the requirement increase. The compatibility measures for individual characteristics may then be averaged to determine the compatibility score. As an example, compatibility values of 1.0, 0.5 and 0.75 representing levels of compatibility for three different characteristics could be averaged to yield an overall compatibility score of 0.75.

The objectives of a publisher can be taken into account in the generation of the compatibility scores 225, for example, by weighting the compatibility measures for certain individual characteristics or making other adjustments. For example, the computing system 110 can store data that indicate which characteristics of publishers are most important in achieving specific objectives. This data can be generated by analysis of tracking data indicating the results of other joint publishing partnerships, and can be used to set weights, multipliers, or other adjustment values for generating compatibility scores. For example, Publisher 1 may indicate that expanding its audience is an objective, and the computing system 110 has determined that a large size of a partner is an important characteristic for achieving that objective from prior publishing experience. If another publisher being considered is large, and thus is more likely to achieve Publisher 1's objective, the overall compatibility score for the publisher, such as 0.75, can be increased by multiplying it with a weighting value, e.g., 1.1. The adjusted score can then be used as a compatibility score 225 for that publisher. As another example, a small publisher's compatibility score would not receive the same boost, or may be adjusted downward with another multiplier, e.g., 0.9.

Many other techniques for generating compatibility scores can be used. For example, the publisher selection model 132 may include a trained neural network or other machine learning classifier that has been trained with many data sets representing outcomes of past joint publishing collaborations. The computing system 110 may provide, as input to the classifier, values representing Publisher 1's requirements and values representing another publisher's characteristics. The computing system 110 may then receive, as output of the classifier, a compatibility score 225 for that publisher with respect to Publisher 1's requirements.

The compatibility scores 225 are then used to rank the various publishers. For example, the publishers can be ranked according to the compatibility scores 225, so that the highest-ranking group has the greatest compatibility to Publisher 1's requirements. A portion of these publishers is selected as the first set of candidate publishing partners 220 for Publisher 1. In some implementations, a particular number of the best matching publishers is selected, such as the top 10 most appropriate publishers.

The computing system 110 may use various criteria in assessing compatibility. For example, the compatibility scores 215, 225 may indicate the similarity between the attributes of one publisher and the publisher request data (e.g., specified requirements or preferences) of another publisher. In addition to, or instead of, assessing similarity, compatibility scores can reflect the flexibility of a publisher's requirements, commonalities or differences among publishers, and other factors. For example, compatibility scores may indicate a low compatibility for publishers that the publisher database 130 indicates are direct competitors, or may indicate high compatibility for publishers that provide complementary products. The compatibility scores may also indicate compatibility of the objectives and requirements of different publishers, e.g., a high level of compatibility for two publishers that both request publication of a video, but low compatibility for a first publisher that requests publication of a video and a second publisher that requests printed media.

In stage (D), the computing system 110 narrows the first set of candidate publishing partners 220 further. The computing system 110 selects a subset of the first set using a second set of compatibility scores 235. These compatibility scores 235 can be generated in the manner described above, e.g., using a comparison of characteristics data and publisher request data across multiple aspects or dimensions. Alternatively the compatibility scores 235 may be generated using a machine learning classifier, the same classifier discussed above or a different classifier. By contrast with the compatibility scores 225, however, the compatibility scores 235 are generated using the characteristics data for Publisher 1, not the requirements or preferences that Publisher 1 specified. That is, the compatibility scores 235 indicate how well the Publisher 1 matches the different requirements specified by the first set of candidate publishing partners 220. Each compatibility score 235 represents how well Publisher 1 matches a set of requirements specified by a different publisher from the first set of candidate publishing partners 220.

By filtering the first set of candidate publishing partners 220 in this manner, the computing system 110 can form mutually beneficial partnerships. Thus, a partnership that benefits Publisher 1 but does not benefit the other publisher is unlikely to be formed. In some implementations, the computing system 110 can apply a threshold and only include in the second set of candidate publishing partners 230 that have at least a minimum compatibility score 225 and a minimum compatibility score 235, thus ensuring that each publisher would receive adequate benefit from the partnership.

The computing system 110 selects a certain number of candidate publishers, such as three, as the second set of candidate publishing partners 230. This can be done by generating a compatibility score 235 for each of the candidate publishing partners 220, ranking according to the compatibility scores 235, and selecting the highest-ranking portion, as shown in FIG. 2.

This second set may be indicated to Publisher 1, which may select from among the indicated options to select a partner for distribution of content. The computing system 110 can indicate, to the selected publisher, that that Publisher 1 is interested in publishing jointly. Once the selected publisher approves of the joint publishing arrangement, the computing system 110 proceeds. As an alternative, the computing system 110 may select the best-matching publisher based on the scores 235, e.g., selecting Publisher 2 which has the highest compatibility score in the second set. That is, in some implementations, the computing system 110 may automatically select the publisher to jointly publish together based on the compatibility scores. The computing system 110 may require agreement by each publisher in a publishing group to proceed. For example, upon selecting publishers to publish together, the computing system 110 can notify each publisher of the others who are selected to publish jointly, request confirmation of approval, and move forward with the joint publication once data indicating authorization for the specific joint publishing arrangement is provided. In some implementations, publishers may indicate authorization in advance to jointly publish with any publisher satisfying specified characteristics.

In step (E), the publishers that the computing system 110 helped select can then generate and upload a joint content item 240. This joint content item 240 can include content elements from each publisher, e.g., both Publisher 1 and Publisher 2. The content items may include images or video portions showing different products provided by the publishers, even unrelated products. The content items for different publishers can be shown simultaneously, during at least some of, or during most of, or for the entire joint content item 240. The joint content item 240 can include, text, audio, video, images, interactive elements, and other content.

The computing system 110 can cause the joint content item 240 to be distributed to users through one or more media channels. For example, the computing system 110 can provide, or instruct another server to provide, the joint content item 240. Similarly the computing system 110 can provide the joint content item 240 to a television broadcast company, a streaming media service, a social media platform, and/or a print media organization for inclusion in a newspaper, magazine, book, and so on.

One of the many advantages of using the computing system 110 to select publishing partners is the ability for a publisher to keep its publishing plans and requirements confidential and hidden from other publishers if desired. Because the computing system 110 performs the analysis privately, without disclosing the objectives and requirements of publishers being considered as potential partners, a publisher's requirements or objectives need not be made known to others. Even if confidentiality is not a concern, the repository of data in the publisher database 130 allows the computing system 110 to efficiently identify the most appropriate partners while taking into account the differing requirements of each publisher. The ability to make these arrangements quickly and dynamically is a great benefit to publishers, especially those considering an array of different partnerships. This can be especially effective for presentations for small-scale personalized or localized presentations, for example, if a large company desired to partner with many different small companies in different cities for small-scale, localized distributions of tailored content.

In addition to the benefits discussed above, the selection by the computing system 110 can produce a better selection result than a publisher could achieve, because the computing system 110 uses information learned from the results of previous joint content publications to adjust the selection process. For example, the information about historical publishing results of different combinations of publishers can be used to weight the process of scoring and selection based on key factors that individual publishers might not even realize would relate to their objectives. Thus, the publisher database 130 and the publisher selection model 132 that are updated with the ongoing learning process can provide more effective and beneficial joint publishing partnerships than publishers could establish on their own.

In some implementations, the computing system 110 can obtain and store a list of options for presenting joint content, e.g., information about various media channels, publishing platforms, distributors, etc. and the requirements and characteristics of each option for publishing content (e.g., media types permitted, size, location, duration, data rate, cost, timing of distribution, type of audience reached, etc.). For example, the computing system 110 may store profiles for different web pages that distribute content, different video streaming sites, different magazines and newspapers, and so on. Based on the combined requirements of a publishing group, the computing system 110 may select one of the publishing options that satisfies the requirements of each of the publishers in the group. In some implementations, if one or more publishers have requirements that limit which publication options are acceptable, the computing system 110 can take these requirements into account in forming publishing groups. The computing system 110 may assign a first publisher with a specific requirement to a particular distribution opportunity (e.g., occupying three quarters of an available display area for a particular web site), and then identify one or more other publishers that would be appropriate to that specific opportunity (e.g., identifying a compatible publisher with content that fits in the remaining one quarter of the display area). Thus, the computing system 110 may take into account the availability and characteristics of specific publishing opportunities when selecting publishers, and may assign them for joint publication for specific publishing opportunities.

Figure 3:
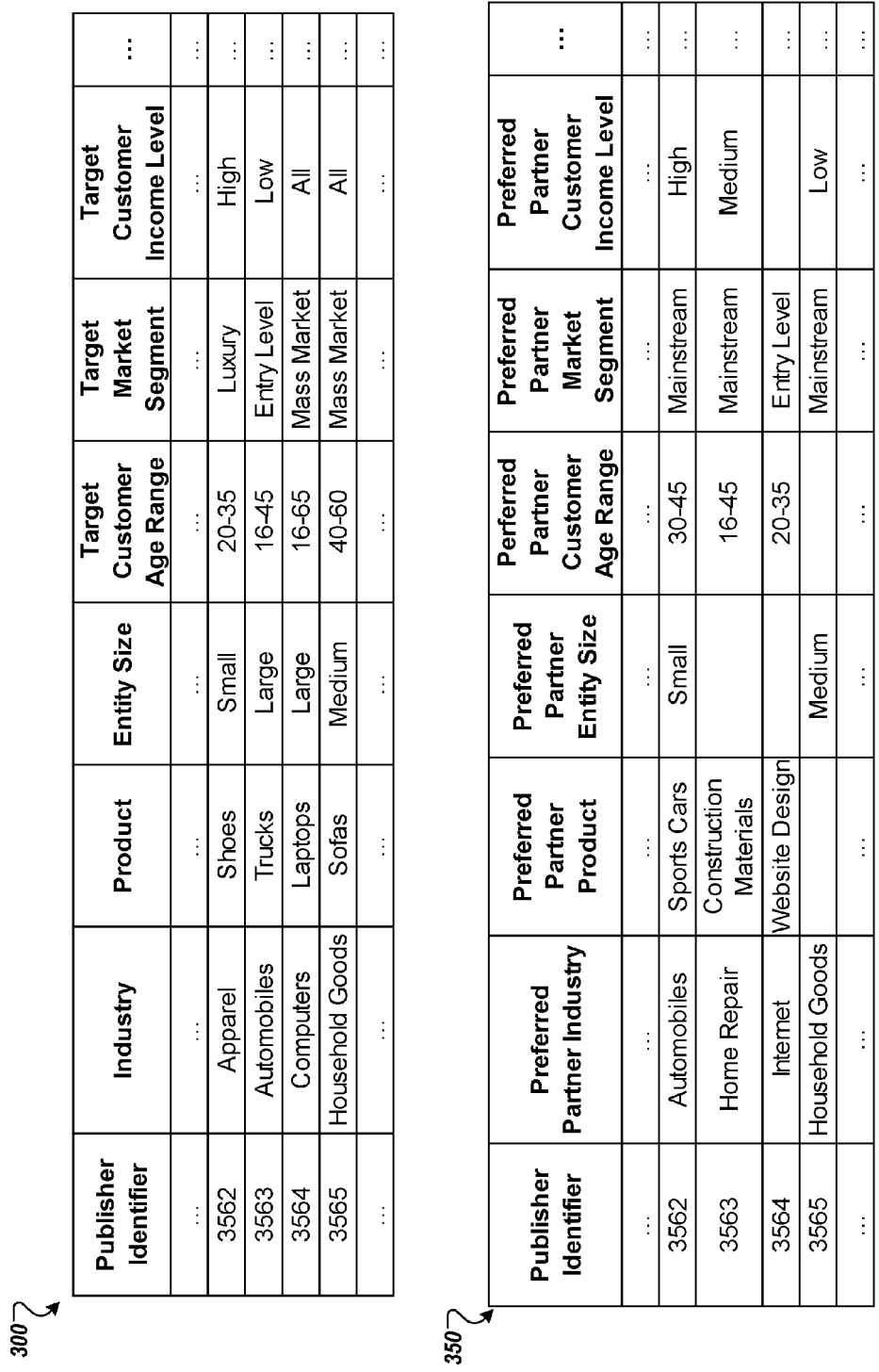
FIG. 3 is a diagram of examples of tables of publisher information.

FIG. 3 is a diagram of examples of tables 300, 350 of publisher information. For example, the tables 300, 350 show an example of types of information that can be included in a publisher database 130. The items illustrated are shown as an example, and the publisher database 130 may include different information or additional information relative to what is illustrated.

In the example, the table 300 shows characteristics data in the publisher database 130. Each row represents a record describing a particular publisher. Each column indicates a different characteristic of a publisher. The characteristics shown include a publisher identifier, an industry the publisher is in, a product the publisher provides, a size of the publisher, a target customer age range, a target market segment, and a target customer income level. Of course, other characteristics and different characteristics may be included.

In the example, table 350 shows requirements data for the same publishers for which data was shown in table 300. Instead of showing the characteristics of those publishers, the records in table 350 show the preferred characteristics that these publishers are looking for in a publishing partner. For example, while table 300 indicates that publisher "3562" is in the apparel industry, the table 350 shows that the publisher intends to partner with a publisher in the automobile industry. Each publisher can specify a unique combination of desired characteristics for a potential publishing partner. A publisher may be able to specify a requirement for any characteristic measured in the publisher database 130. Publishers may also decide not to make a requirement for certain characteristics. The blank cells in table 350 show where publishers have declined to define a specific requirement, so that that characteristic is not a factor in selection, e.g., a publisher will be considered as a potential partner regardless of the value for the characteristic left blank.

Figure 4:
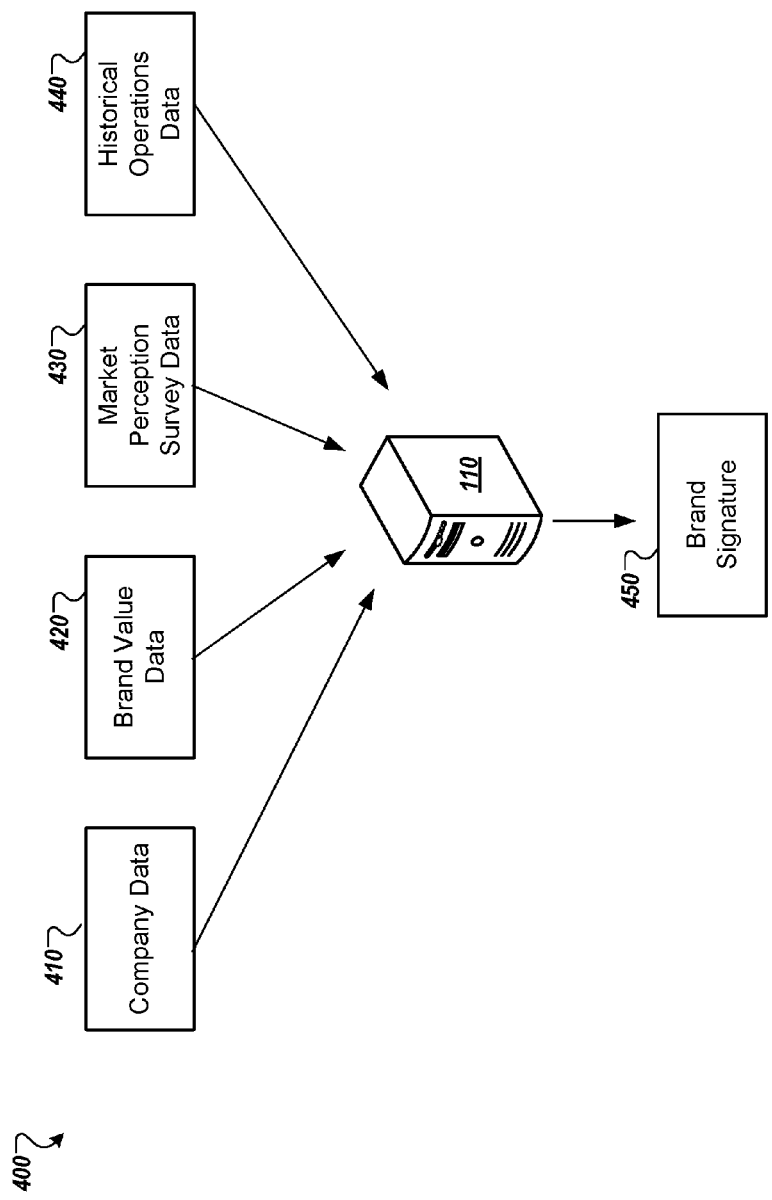
FIG. 4 is a diagram illustrating generation of a publisher signature.

FIG. 4 is a diagram of a conceptual view 400 of generation of a publisher's brand signature. The example shows different types of information that can be used by the computing system 110 to generate a brand signature 450 for a publisher that is a company. This information includes company data 410, brand value data 420, market perception survey data 430, and historical operations data 440. The company data 410 may be self-reported by the publisher or may be acquired through third parties. The brand value data 420 can include information from databases such as Interbrand, WPP BrandZ, World Intellectual Property Organization, BrandBASE, etc. This may include the characteristics data discussed above. The market perception survey data 430 can indicate measures of how the publisher is perceived by individuals or other businesses. This information may indicate how well recognized a publisher is, as well as the extent that individuals associate certain attributes with the publisher (e.g., quality, value, prestige, dependability, environmental conservation, etc.). Historical operations data 440 can indicate prior distribution of content, whether done independently or jointly, and measured results of those operations.

The computing system 110 can take the information from the data sets shown and create a standardized representation of the publisher's brand. This brand signature can provide a compact, efficient data set for comparison with the requirements specified by other publishers to assess whether the publisher would be an appropriate selection for the joint publishing.

Figure 5:
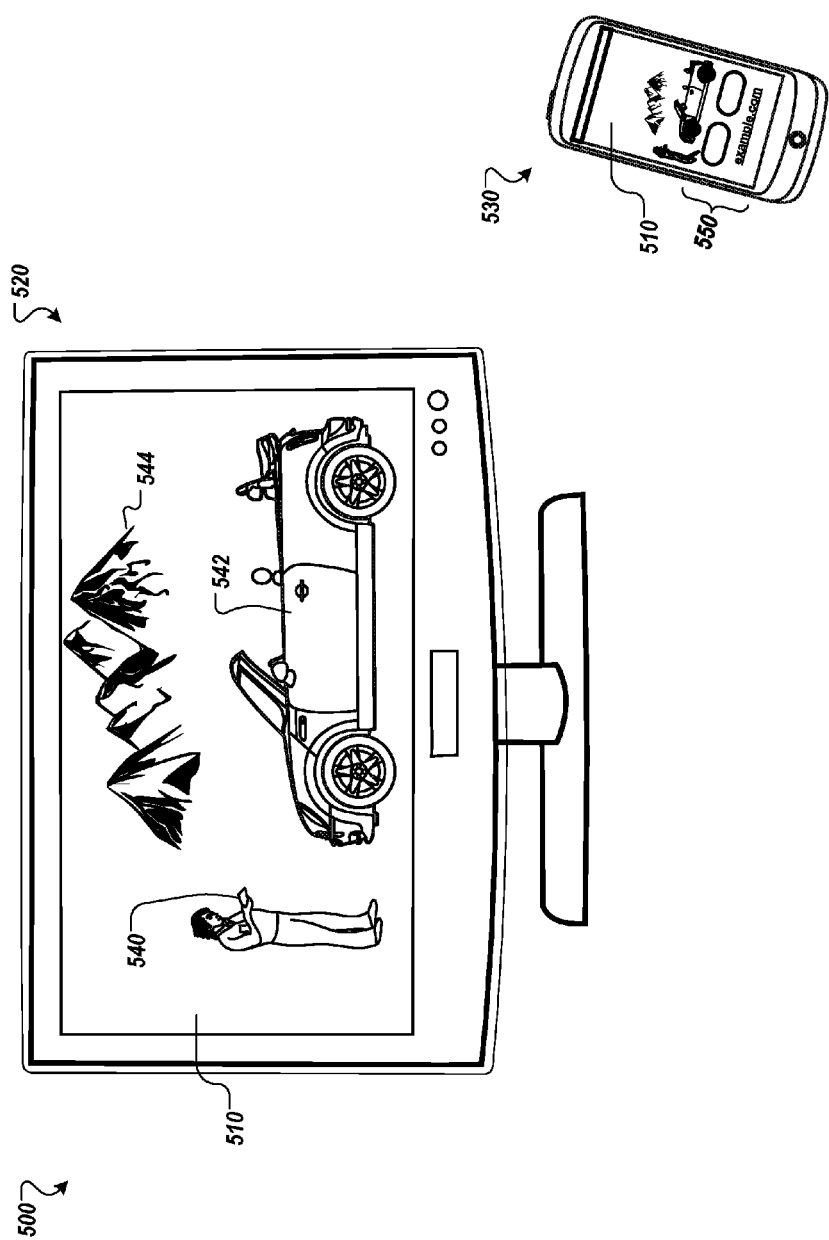
FIG. 5 is a diagram illustrating display of jointly published content through multiple media channels.

FIG. 5 is a diagram illustrating a conceptual view 500 representing display of jointly published content through multiple media channels. The content that publishers distribute jointly can be provided through multiple media channels. For example, three publishers may collaborate to produce a content item 510 that is provided through a television broadcast 520 as well as through an Internet platform 530, such as streaming media, social media, a web page, etc. The content item 510 shows three different elements corresponding to the businesses of the three publishers, e.g., a first element 540 showing an electronic device provided by a first publisher, a second element 542 showing a vehicle provided by a second publisher, and a third element 544 showing mountains to represent travel services. While each of these publishers provides a different product or service, the simultaneous display of the different content elements within the content item 510 can enhance recognition and association of the products. The joint distribution also lowers the per-publisher cost of distribution of the content item 510, since costs are shared among each of the three publishers.

Variations of the content item 510 can be provided through different media channels. For example, the Internet platform 530 can include interactive elements 550 that a viewer can interact with to visit web pages for the different publishers or obtain other information. The inclusion of separate interactive elements 550 benefits each publisher by allowing the publishers to include or link to specialized content from the joint content item 510. In addition, the inclusion of the separate interactive elements can facilitate tracking of a viewer's interests and attention, since the choice of which links a user selects, and at what point in the presentation they are selected, can provide valuable information about the effectiveness of the joint content item 510 in achieving the objectives specified by the publishers. Interacting with a link for a particular publisher demonstrates interest and engagement, while interactions with multiple links of different publishers is a strong signal of association between the different publishers.

For each media channel that is used to distribute the content item 510, tracking data can be obtained. In some instances, eye tracking is performed using a camera of a television, a computer, one or more home sensors, or other device to track which portions of the content item 510 the user's eyes focus on for the longest amount of time. This information may indicate, for example, that a viewer spent 30% of the viewing time viewing elements from the first publisher, 15% of the time viewing elements from the second publisher, and 55% viewing elements of the third publisher. The relative viewing durations, and other measures such as the number or frequency of switches in focus between elements of the different publishers, can provide valuable information to assess whether users respond as desired by the publishers. Other data can be obtained, including logs or histories of user actions such as a purchase of items shown in the joint content item 510, use of publisher names or product names in search queries, later navigation to web pages associated with the publishers, and so on. Surveys can also be provided to users who have viewed, or likely may have viewed, the joint content item 510.

Figure 6:
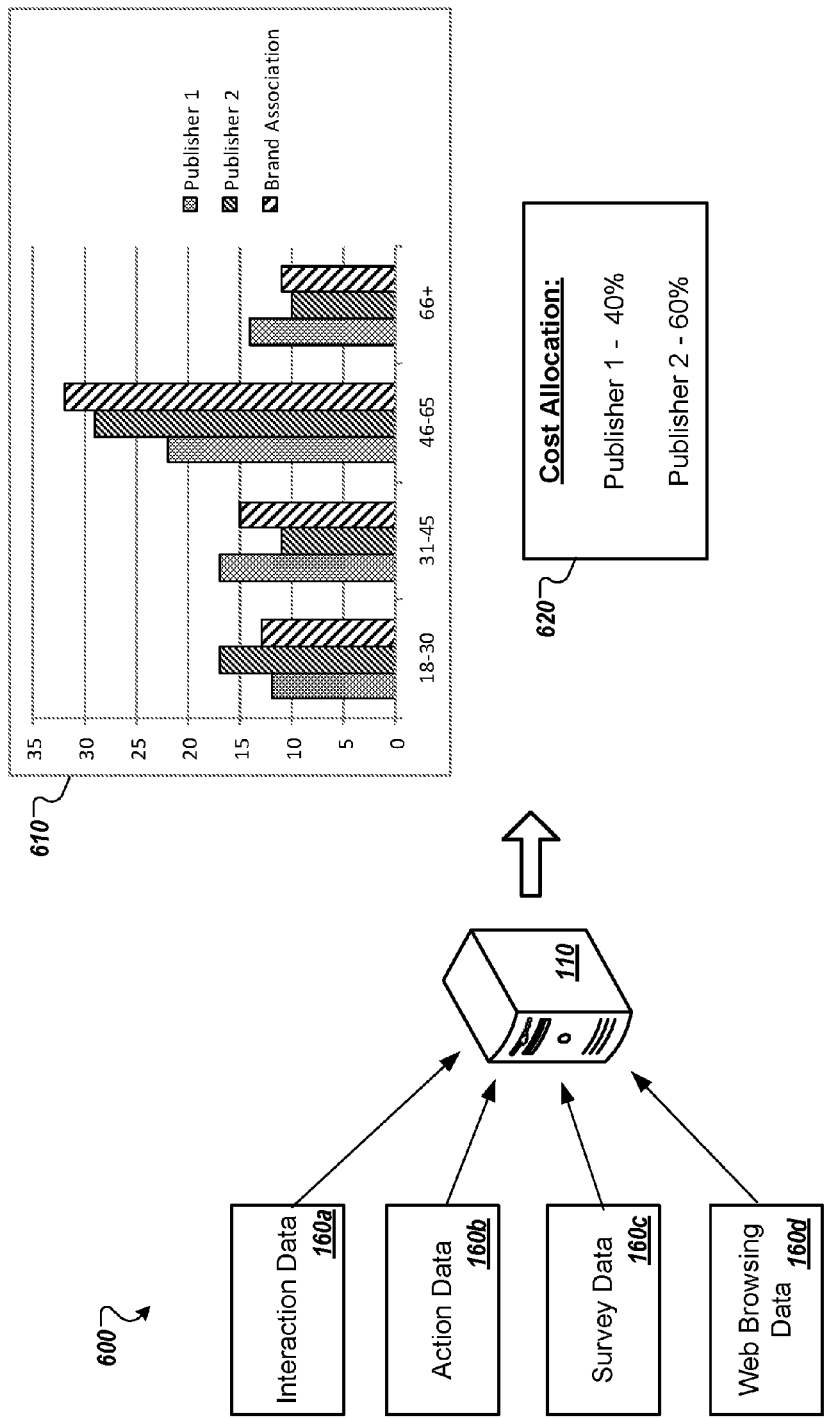
FIG. 6 is a diagram illustrating an example of analysis of results of jointly distributing content.

FIG. 6 is a diagram illustrating a conceptual view 600 of an example of analysis of results of jointly distributing content. In the example, the computing system 110 receives tracking data of several types, e.g., interaction data 160*a* indicating user interaction with an item of joint content while it is being presented, action data 160*b* indicating actions of users related to the content item or the publishers, survey data 160*c* indicating user responses to surveys after viewing the joint content item, and web browsing data 160*d* indicating visits to web pages and search queries that users submitted after viewing the joint content item. The computing system 110 can collect this information and assess it to determine whether the objectives of the different publishers have been achieved, as well as how the presentation of the joint content item can be improved. Further, based on comparisons with other joint publication arrangements, the computing system 110 can determine whether differentiating factors result in the joint publication being more or less effective at achieving specific objectives. As a result, the computing system 110 can update the publisher database 130 and/or publisher selection model 132 to include this information for later use in selecting other publishing partnerships.

The analysis results represented in FIG. 6 include a chart 610 showing results of certain types of user action with respect to two different publishers. For example, the first two bars can represent a number of clicks of two different links in a content item, one for each of two publishers who collaborated on the distribution. As illustrated, the results can be broken down into sub-groups for more fine-grained information, in this instance, by various age ranges. Other factors, or combinations of factors may be used to highlight the contexts or characteristics that are most applicable to certain audiences or situations. The third item indicated in the chart 610 is a measure of brand association, which may be based on tracked user actions as well as survey data and other sources.

The computing system 110 can also determine an allocation 620 for distribution costs to assign to the publishers. The dynamic assignment of distribution costs helps reduce the risk to a publisher. Rather than paying the entire cost in the case of independent publishing, a publisher can agree to cover a variable share of the costs which will usually be less than the full cost. The cost will increase above 50% if a publisher is more capable than the partner in achieving certain outcomes (e.g., user interaction, recognition, etc.) but this would indicate that the publisher has been successful in achieving at least some of the objectives. The cost will decrease below 50% if a publisher is less successful. Because the publisher has received less of the benefit, the publisher is assigned less of the cost also. Thus the risk of incurring costs is decreased compared to independent publishing, and a relatively unsuccessful campaign will result in a further cost reduction.

Figure 7:
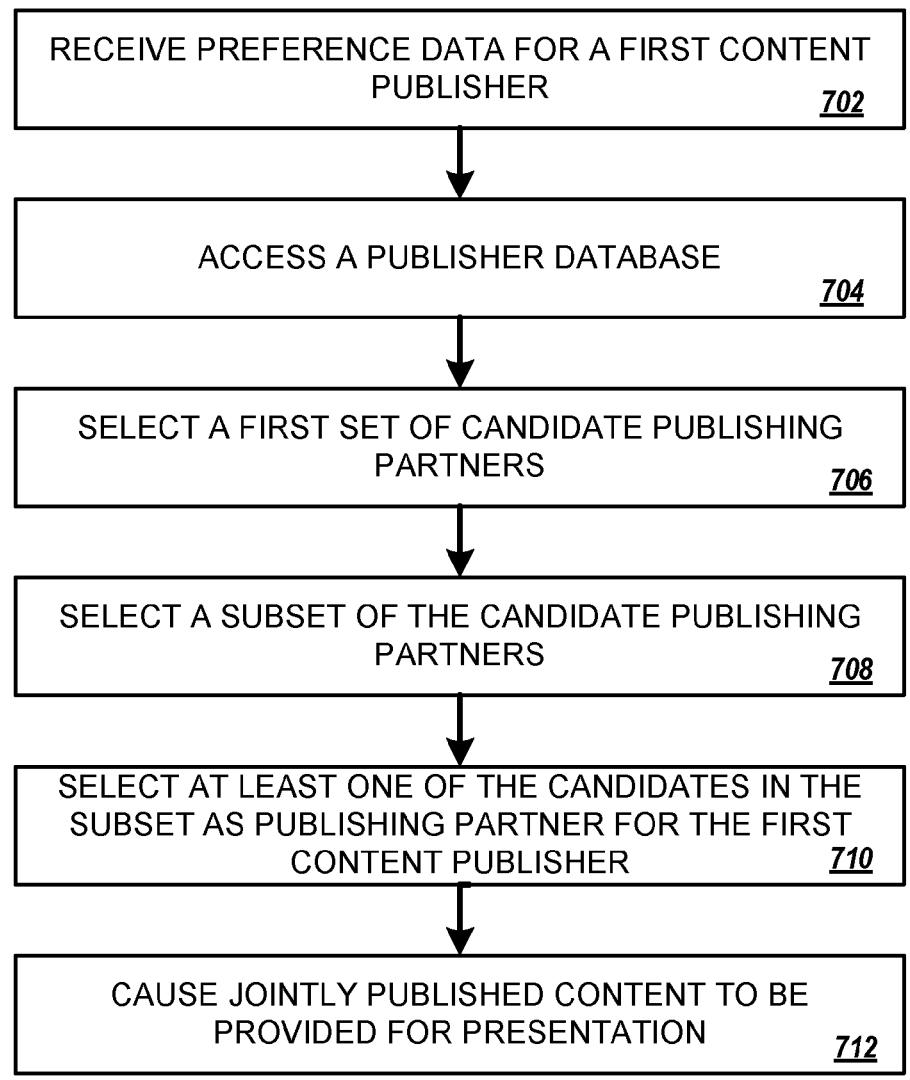
FIG. 7 is a flow chart illustrating an example of a process for joint distribution of content.

FIG. 7 is a flow chart illustrating an example of a process 700 for joint distribution of content. The process 700 can be performed by one or more computers, such as the computing system 110 discussed above.

In step 702, publisher request data is received for a first content publisher. The publisher request data indicates preferred characteristics for a publishing partner to distribute content jointly with the first content publisher. This information may represent user input transmitted from a client device to the computing system 110 over a network. Characteristics of the first content publisher can be received, from the first content publisher or another source.

In step 704, a publisher database is accessed. The publisher database indicates characteristics of other content publishers and publisher request data of the other content publishers. As discussed above, the publisher database can store data indicating publisher characteristics, as well as publisher request data indicating preferred characteristics desired in a publishing partner and objectives for joint publication.

In step 706, a first set of candidate publishing partners for the first content publisher is selected. The first set is selected based on a degree of compatibility between (i) the preferred characteristics specified by the first content publisher and (ii) the characteristics of the other content publishers indicated in the database.

In some implementations, selecting a first set of candidate publishing partners includes determining a plurality of compatibility scores. Each of the compatibility scores indicates a degree of match between preferred characteristics specified by the first content publisher and the characteristics of a specific content publisher of the multiple content publishers described in the publisher database. Multiple content publishers can be ranked based on the compatibility scores. A highest-ranking subset of the multiple content publishers can be selected as the first set of candidate publishing partners. For example, the publishers with the top n compatibility scores can be selected, where n is an integer such as 10, 50, 100, etc.

In step 708, a second set of candidate publishing partners is selected as a subset of the first set of candidate publishing partners. The second set is selected based on a degree of compatibility between (i) characteristics of the first content publisher and (ii) the publisher request data of the candidate publishing partners.

In some implementations, selecting the second set of candidate publishing partners includes determining a compatibility score for each of the candidate publishing partners in the first set. The compatibility score for each specific candidate content publisher indicates a degree of match between the characteristics of the first content publisher and the preferred characteristics that the specific candidate content publisher specified for a publishing partner. The candidate publishing partners in the first set can then be ranked based on the compatibility scores. A highest-ranking subset of the candidate publishing partners in the first set of candidate publishing can be selected as the second set of candidate publishing partners. For example, the candidate publishers having the m highest scores can be selected, where m is an integer, such as 3, 5, etc.

In step 710, one of the content publishers in the second set of candidate publishing partners is designated as the publishing partner for the first content publisher. In some implementations, multiple of the content publishers in the second set are selected and designated as publishing partners for the first content publisher. As a result a publishing group may include two, three, four or more different publishers.

In step 712, a jointly published content item that references both the first content publisher and the selected publishing partner is provided for presentation to content recipients. For example, the computing system 110 or another system can cause a joint content item to be distributed to multiple users over one or more media channels. For example, the computing system 110 can cause the jointly published content item to be provided for presentation through one or more media channels, such as television, radio, a newspaper, a magazine, printed mail, an application, a web page, e-mail, and/or social media. The jointly published content item can include content elements for different publishers that are shown simultaneously, during at least some of, or during most of, or for the entire jointly published content item. For example, a video could show two products of different publishers being used simultaneously, along with logos or branding for the publishers. As another example, an image can include content elements from different publishers shown simultaneously. As another example, jointly published content displayed through a Web page or application can include interactive elements (e.g., links, buttons, etc.) for different publishers, shown simultaneously.

In some implementations, wherein receiving the publisher requests data for the first content publisher comprises receiving data indicating a distribution objective of the first content publisher. Accessing the database can include accessing a database that indicates distribution objectives of the multiple content publishers. Determining the compatibility score for a candidate publishing partner can be based on a degree of match between the distribution objective of the first content publisher and a distribution objective of the candidate publishing partner.

In some implementations, a brand signature is determined for the first content publisher and/or the other content publishers. A brand signature can be a representation of the characteristics or attributes of a publisher. The brand signatures can be used to generate compatibility scores or otherwise compare characteristics of publishers with the requirements specified by other publishers. Indeed, the requirements of a publisher may be represented as a brand signature of a hypothetical partner, and then compared to brand signatures for other publishers.

Figure 8:
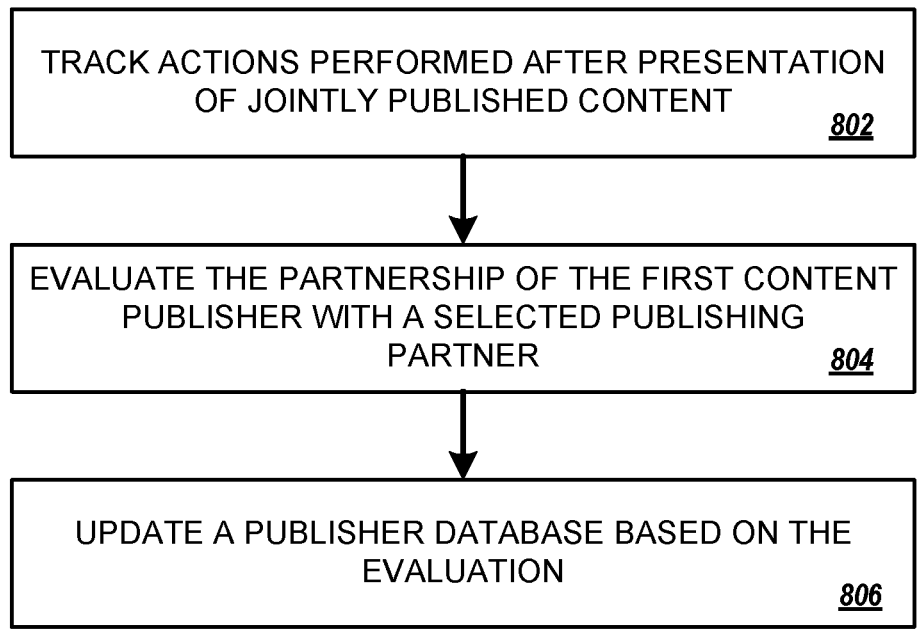
FIG. 8 is a flow chart illustrating an example of a process for updating a system for facilitating joint publication.

FIG. 8 is a flow chart illustrating an example of a process 800 for updating a system for facilitating joint publication. The process 800 can be performed by one or more computers, such as the computing system 110 discussed above.

In step 802, actions performed after the presentation of jointly published content are tracked. Data indicating these actions can be obtained from a variety of sources. The tracked actions can indicate, for example, interaction with the jointly distributed content. The jointly distributed content can include multiple interactive elements, such as links, which correspond to different publishers (e.g., links to separate web pages for each publisher). The tracking data can indicate how many times each of the different links corresponding to different publishers have been navigated. Other types of actions that can be tracked include later visits to web pages, purchases or other transactions for items shown in the joint content, submission of queries regarding elements of the joint content, and so on. In addition, survey responses can be obtained from users that have been presented the jointly distributed content.

In step 804, the joint publishing partnership of the first content publisher with a selected publishing partner is evaluated. Measured results, such as measures of user actions and user engagement, can be evaluated with respect to the objectives specified by the different publishers that jointly publish the joint content item. The computing system 110 can determine to what extent the measured results achieve the different objectives, and which factors (e.g., publisher characteristics, content characteristics, media channel characteristics, etc.) account for the differences in results compared to other joint distribution schemes involving other publishers.

In some implementations, the evaluation can include determining a measure of brand affinity for the first content publisher and the selected publishing partner based on the data indicating actions performed by viewers of the jointly published content item. The jointly published content item may have multiple corresponding actions, including a first action for the first content publisher and a second action for the selected publishing partner. To determine the measure of affinity between the publishers, the computing system 110 can determine a measure of viewers of the jointly published content item that performed both the first action and the second action after viewing the jointly published content item. For example, when a joint content item includes Web links for two publishers, a percentage, count, or other measure of the users that navigated to both of the linked web pages can be used as a measure of affinity between the two publishers.

In some implementations, the tracking data includes eye movement data indicating eye movements of viewers while viewing the jointly published content item. Based on this eye movement data, the computing system 110 can determine one or more scores indicating levels of engagement of the viewers with different portions of the joint content item. For example, the scores can include (i) a score for engagement with a first portion of the jointly published content item that corresponds to the first content publisher and (ii) a score for engagement with a second portion of the jointly published content item that corresponds to the selected publishing partner.

In step 806, a publisher database and/or a publisher selection model are updated based on the evaluation. Performing the updates can include altering one or more parameters used to generate compatibility scores between content publishers and candidate publishing partners.

In some implementations, the computing system 110 determines a first amount of the actions performed that are attributable to the first publisher and a second amount of the actions performed that are attributable to the second publisher. The computing system can determine an allocation of costs for publishing the jointly published content item based on the first amount and the second amount. This allocation can be used retrospectively to account for costs incurred for prior distribution. In some implementations, the allocation may vary dynamically over time as the proportions of user actions change.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A system comprising:
   one or more computers; and
   one or more storage devices storing instructions that, when executed by the one or more computers, cause the one or more computers to perform operations comprising:
      receiving, by the one or more computers, publisher information from a plurality of publisher systems over one or more computer networks, each of the publisher systems providing publisher information indicating characteristics of a corresponding content publisher;
      processing, by the one or more computers, the received publisher information from the plurality of publisher systems to generate or update a publisher database;
      receiving, by the one or more computers, publisher request data from a first publisher system for a first content publisher over the one or more computer networks, the publisher request data indicating preferred characteristics for a publishing partner to distribute content jointly with the first content publisher;
      accessing, by the one or more computers, the publisher database that indicates characteristics of other content publishers and publisher request data of the other content publishers;
      selecting, by the one or more computers, a first set of candidate publishing partners for the first content publisher based on a degree of compatibility between (i) the preferred characteristics specified by the first content publisher and (ii) the characteristics of the other content publishers indicated in the database;
      selecting, by the one or more computers, a second set of candidate publishing partners as a subset of the first set of candidate publishing partners based on a degree of compatibility between (i) characteristics of the first content publisher and (ii) the publisher request data of the candidate publishing partners;
      designating, by the one or more computers, one of the content publishers in the second set of candidate publishing partners as a selected publishing partner for the first content publisher;
      providing, by the one or more computers, information to the first publisher system that indicates the designated content publisher from the second set of candidate publishing partners;
      based on designating one of the content publishers in the subset as the selected publishing partner for the first content publisher, causing a jointly published content item that references both the first content publisher and the selected publishing partner to be transmitted over multiple communication channels, at least one of the multiple communication channels comprising a computer network, wherein causing the jointly published content item to be transmitted includes causing, by the one or more computers, a jointly published content item that references both the first content publisher and the selected publishing partner to be provided for presentation to content recipients;
      after causing the jointly published content item to be transmitted, obtaining, by the one or more computers, tracking data indicating actions that the content recipients performed during or after presentation of the jointly published content item, wherein obtaining the tracking data comprises obtaining tracking data produced by phones, tablets, computers, set top boxes, or televisions associated with the content recipients; and
      altering, by the one or more computers, one or more parameters of the publisher database that are used to generate compatibility scores for content publishers and candidate publishing partners, the one or more parameters being altered based on an evaluation of the tracking data by the one or more computers.

2. The system of claim 1, wherein the operations comprise:
   accessing a publisher selection model trained using data describing multiple joint publication outcomes, the publisher selection model comprising a machine learning classifier;
   generating one or more scores using the publisher selection model;
   selecting the first set of candidate publishing partners, selecting the second set of publishing partners, or designating one of the content publishers based on the one or more scores generated using the publisher selection model, updating, by the one or more computers, the machine learning classifier based on the tracking data; and identifying, by the one or more computers and based on output of the updated machine learning classifier, a publishing partner for a second content publisher that is different from the first content publisher.

3. The system of claim 1, wherein selecting the first set of candidate publishing partners comprises:

determining a plurality of compatibility scores, wherein each of the compatibility scores indicates a degree of match between preferred characteristics specified by the first content publisher and the characteristics of a specific content publisher of the other content publishers described in the publisher database;

ranking the other content publishers based on the compatibility scores; and selecting, as the first set of candidate publishing partners, a highest-ranking subset of the other content publishers.

4. The system of claim 1, wherein selecting the second set of candidate publishing partners comprises:

determining a compatibility score for each of the candidate publishing partners in the first set, wherein the compatibility score for each specific candidate content publisher indicates a degree of match between the characteristics of the first content publisher and the preferred characteristics that the specific candidate content publisher specified for a publishing partner;

ranking the candidate publishing partners in the first set based on the compatibility scores; and selecting, as the second set of candidate publishing partners, a highest-ranking subset of the candidate publishing partners in the first set of candidate publishing partners.

5. The system of claim 4, wherein receiving the publisher request data for the first content publisher comprises receiving data indicating a distribution objective of the first content publisher;

wherein accessing the database comprises accessing a database that indicates distribution objectives of the other content publishers; and wherein determining the compatibility score for a candidate publishing partner is further based on a degree of match between the distribution objective of the first content publisher and a distribution objective of the candidate publishing partner.

6. The system of claim 1, wherein the jointly published content item comprises (i) one or more first interactive elements corresponding to the first publishing partner and (ii) one or more second interactive elements corresponding to the publishing partner for the first content publisher;

wherein the operations comprise:

determining, by the one or more computers and based on the tracking data, relative amounts of interaction of the content recipients with the one or more first interactive elements and the one or more second interactive elements; and altering, by the one or more computers, the parameters of the publisher database based on the relative amounts of interaction determined based on the tracking data.

7. The system of claim 1, wherein the operations further comprise obtaining, by the one or more computers and as the jointly published content item, a particular content item that includes (i) a first content portion that includes content of the first content publisher and (ii) a second content portion that includes content of the selected publishing partner for the first content publisher; and wherein causing the jointly published content item to be transmitted comprises causing the particular content item to be transmitted through a first communication channel that is configured to provide content items of a standardized size or duration, wherein the particular content item combines the content of the first content publisher from the first content portion and content of the selected publishing partner for the first content publisher of the second content portion in a single content item within the standardized size or duration associated with the first communication channel.

8. The system of claim 7, wherein the first communication channel is configured to provide video data, and wherein the particular content item comprises a video segment, wherein the first content portion comprises first video content of the first content publisher, wherein the second content portion comprises video content of the second content publisher, and wherein the particular content item includes the video content of the first publisher and the video content of the second content publisher combined within the standardized size or duration.

9. A method performed by one or more computers, the method comprising:

receiving, by the one or more computers, publisher information from a plurality of publisher systems over one or more computer networks, each of the publisher systems providing publisher information indicating characteristics of a corresponding content publisher;

processing, by the one or more computers, the received publisher information from the plurality of publisher systems to generate or update a publisher database;

receiving, by the one or more computers, publisher request data from a first publisher system for a first content publisher over the one or more computer networks, the publisher request data indicating preferred characteristics for a publishing partner to distribute content jointly with the first content publisher;

accessing, by the one or more computers, the publisher database that indicates characteristics of other content publishers and publisher request data of the other content publishers;

selecting, by the one or more computers, a first set of candidate publishing partners for the first content publisher based on a degree of compatibility between (i) the preferred characteristics specified by the first content publisher and (ii) the characteristics of the other content publishers indicated in the database;

selecting, by the one or more computers, a second set of candidate publishing partners as a subset of the first set of candidate publishing partners based on a degree of compatibility between (i) characteristics of the first content publisher and (ii) the publisher request data of the candidate publishing partners;

designating, by the one or more computers, one of the content publishers in the second set of candidate publishing partners as a selected publishing partner for the first content publisher;

providing, by the one or more computers, information to the first publisher system that indicates the designated content publisher from the second set of candidate publishing partners;

based on designating one of the content publishers in the subset as the selected publishing partner for the first content publisher, causing a jointly published content item that references both the first content publisher and the selected publishing partner to be transmitted over multiple communication channels, at least one of the multiple communication channels comprising a computer network, wherein causing the jointly published content item to be transmitted includes causing, by the one or more computers, a jointly published content item that references both the first content publisher and the selected publishing partner to be provided for presentation to content recipients, after causing the jointly published content item to be transmitted, obtaining, by the one or more computers, tracking data indicating actions that the content recipients performed during or after presentation of the jointly published content item, wherein obtaining the tracking data comprises obtaining tracking data produced by phones, tablets, computers, set top boxes, or televisions associated with the content recipients; and altering, by the one or more computers, one or more parameters of the publisher database that are used to generate compatibility scores for content publishers and candidate publishing partners, the one or more parameters being altered based on an evaluation of the tracking data by the one or more computers.

10. The method of claim 9, wherein selecting the first set of candidate publishing partners comprises:

determining a plurality of compatibility scores, wherein each of the compatibility scores indicates a degree of match between preferred characteristics specified by the first content publisher and the characteristics of a specific content publisher of the other content publishers described in the publisher database;

ranking the other content publishers based on the compatibility scores; and selecting, as the first set of candidate publishing partners, a highest-ranking subset of the other content publishers.

11. The method of claim 9, wherein selecting the second set of candidate publishing partners comprises:

determining a compatibility score for each of the candidate publishing partners in the first set, wherein the compatibility score for each specific candidate content publisher indicates a degree of match between the characteristics of the first content publisher and the preferred characteristics that the specific candidate content publisher specified for a publishing partner;

ranking the candidate publishing partners in the first set based on the compatibility scores; and selecting, as the second set of candidate publishing partners, a highest-ranking subset of the candidate publishing partners in the first set of candidate publishing partners.

12. The method of claim 11, wherein receiving the publisher request data for the first content publisher comprises receiving data indicating a distribution objective of the first content publisher;

wherein accessing the database comprises accessing a database that indicates distribution objectives of the other content publishers; and wherein determining the compatibility score for a candidate publishing partner is further based on a degree of match between the distribution objective of the first content publisher and a distribution objective of the candidate publishing partner.

13. The method of claim 9, wherein determining the first set of candidate publishing partners or the second set of candidate publishing partners comprises:

determining a brand signature for the first content publisher; and comparing the brand signature for the first content publisher with brand signatures in the database.

14. The method of claim 9, further comprising evaluating the partnership of the first content publisher with the selected publishing partner based on the tracking data.

15. The method of claim 9, further comprising determining, by the one or more computers and based on the tracking data, a first amount of actions indicated by the tracking data that are attributable to the first content publisher and a second amount of the actions performed indicated by the tracking data that are attributable to the selected publishing partner for the first content publisher.

16. The method of claim 15, further comprising determining an allocation of costs for publishing the jointly published content item based on the first amount and the second amount.

17. The method of claim 9, further comprising determining a measure of brand affinity for the first content publisher and the selected publishing partner based on the data indicating viewership and/or actions performed by viewers of the jointly published content item.

18. The method of claim 17, wherein the jointly published content item has multiple corresponding actions including a first action for the first content publisher and a second action for the selected publishing partner; and wherein determining the measure of brand affinity comprises determining a measure of viewers of the jointly published content item that performed both the first action and the second action after viewing the jointly published content item.

19. The method of claim 9, wherein obtaining the tracking data indicating viewership and/or actions performed by viewers of the jointly published content item comprises obtaining eye movement data indicating eye movements of viewers while viewing the jointly published content item; and wherein the method includes determining, based on the eye movement data, one or more scores indicating levels of engagement of the viewers with a first portion of the jointly published content item that corresponds to the first content publisher and a second portion of the jointly published content item that corresponds to the selected publishing partner.

20. One or more non-transitory computer-readable storage media storing instructions that, when executed by one or more computers, cause the one or more computers to perform operations comprising:

receiving, by the one or more computers, publisher information from a plurality of publisher systems over one or more computer networks, each of the publisher systems providing publisher information indicating characteristics of a corresponding content publisher;

processing, by the one or more computers, the received publisher information from the plurality of publisher systems to generate or update a publisher database;

receiving, by the one or more computers, publisher request data from a first publisher system for a first content publisher over the one or more computer networks, the publisher request data indicating preferred characteristics for a publishing partner to distribute content jointly with the first content publisher;

accessing, by the one or more computers, the publisher database that indicates characteristics of other content publishers and publisher request data of the other content publishers;

selecting, by the one or more computers, a first set of candidate publishing partners for the first content publisher based on a degree of compatibility between (i) the preferred characteristics specified by the first content publisher and (ii) the characteristics of the other content publishers indicated in the database;

selecting, by the one or more computers, a second set of candidate publishing partners as a subset of the first set of candidate publishing partners based on a degree of compatibility between (i) characteristics of the first content publisher and (ii) the publisher request data of the candidate publishing partners;

designating, by the one or more computers, one of the content publishers in the second set of candidate publishing partners as a selected publishing partner for the first content publisher;

providing, by the one or more computers, information to the first publisher system that indicates the designated content publisher from the second set of candidate publishing partners;

based on designating one of the content publishers in the subset as the selected publishing partner for the first content publisher, causing a jointly published content item that references both the first content publisher and the selected publishing partner to be transmitted over multiple communication channels, at least one of the multiple communication channels comprising a computer network, wherein causing the jointly published content item to be transmitted includes causing, by the one or more computers, a jointly published content item that references both the first content publisher and the selected publishing partner to be provided for presentation to content recipients;

after causing the jointly published content item to be transmitted, obtaining, by the one or more computers, tracking data indicating actions that the content recipients performed during or after presentation of the jointly published content item, wherein obtaining the tracking data comprises obtaining tracking data produced by phones, tablets, computers, set top boxes, or televisions associated with the content recipients, and altering, by the one or more computers, one or more parameters of the publisher database that are used to generate compatibility scores for content publishers and candidate publishing partners, the one or more parameters being altered based on an evaluation of the tracking data by the one or more computers.

* * * * *

UNITED STATES PATENT AND TRADEMARK OFFICE
CERTIFICATE OF CORRECTION

PATENT NO.         : 9,680,923 B1                          Page 1 of 1
APPLICATION NO.    : 15/287338
DATED              : June 13, 2017
INVENTOR(S)        : Pranav Jain and Pravin Jain It is certified that error appears in the above-identified patent and that said Letters Patent is hereby corrected as shown below:

In the Claims

In Claim 2, Column 26, Line 67, delete "model," and insert -- model; --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*